Patented July 23, 1935

2,008,719

UNITED STATES PATENT OFFICE 2,008,719

PROCESS OF POLYMERIZATION

Glen M. Kuettel, Roselle, N. J., assignor to Du Pont Viscoloid Company, Wilmington, Del., a corporation of Delaware No Drawing. Application July 24, 1934, Serial No. 736,677

8 Claims. (Cl. 260—2)

This invention relates to a process of polymerization and, more particularly, to an improved process of polymerizing the liquid polymerizable compounds of the class including acrylic and alkacrylic acids, their homologues, and derivatives, to a bubble free solid having no internal visual defects. The invention particularly relates to such processes in which liquid methyl alpha methacrylate monomer is polymerized.

Methyl alpha methacrylate monomer is a liquid having a boiling point of 100–101° C., which may be readily polymerized to a solid. Its preparation is disclosed in Rowland Hill U. S. application Serial No. 641,113, filed November 3, 1932. This liquid, as well as the other liquid polymerizable compounds of the class mentioned above, may be polymerized in block or other solid shapes free from flaws, if a relatively long period of time is allowed for the resin to set up or polymerize, for example, 14–30 days. Such a time consuming procedure increases inordinately the cost of the finished product, due to the tie-up of apparatus and of material in process.

By employing polymerization catalysts, high temperatures, actinic light, and/or other means, it is known that polymerization may be greatly speeded up. However, where the polymerization has been materially accelerated by heretofore known methods, especially in polymerizing material in solid shapes, the resulting product has always contained internal bubbles, flaws, and other visual defects which renders it more or less unfit for fabrication into articles which are valuable because of their appearance. Moreover, the larger the size of the solid shape, the greater the tendency to form bubbles and also the greater the tendency for incomplete polymerization of the whole, for, although the outer surface of the mass may be completely polymerized, the center is often only partially polymerized and, in some instances, substantially not at all.

In U. S. application Serial No. 728,550 of Donald J. Loder, filed June 1, 1934, entitled "Process of polymerization", is disclosed an improved method of polymerizing to avoid the objections of the prior art, as discussed above. This process comprises essentially heating the liquid methyl alpha methacrylate monomer to a point somewhat below the temperature of bubble formation to initiate polymerization and then withdrawing the exothermic heat resulting from the polymerization reaction at substantially the rate it is formed. In this manner, formation of bubbles and other internal flaws is avoided and yet polymerization may be carried out at a relatively fast rate. Usually the mass being polymerized is held at a temperature of about 80° C. in this process. By the term "temperature of bubble formation" as used herein is meant that temperature at which some component of the mass being polymerized is volatilized or dissolved air, or the like, is released in the mass. This temperature is not necessarily as high as the boiling point of the monomer being treated since byproducts of the polymerization, or other components, if any, of the mass may be volatilized at a temperature lower than the boiling point of the monomer, or dissolved gases may be released at a temperature lower than the boiling point of the monomer, in either case causing the formation of bubbles, possibly at a temperature appreciably below that at which the monomer itself would volatilize.

While the process disclosed in the Loder application is believed to be theoretically correct to effect rapidly substantially complete polymerization of a mass without formation of internal flaws such as bubbles, and in solid masses of relatively small size may be carried out to excellent advantage, practical operating difficulties in control of temperature are encountered where large masses, in solid shapes, of the monomer are being polymerized. Whereas smaller masses of the monomer may be expeditiously polymerized according to the Loder process without danger of bubble formation and internal flaws in the finished product, yet, when larger masses of the monomer are being polymerized, it is necessary, to avoid the danger of bubble formation, to keep the average temperature of the mass quite low so that local portions of the mass may not heat up to the temperature of bubble formation. Because it is necessary to keep the average temperature of the mass relatively low during the polymerization, the speed of polymerization is appreciably slowed up and not to be compared with the speed at which the polymerization may take place in smaller masses of the monomer.

An object of the present invention is to provide an improved process over the above mentioned Loder process in polymerizing compositions containing liquid methyl alpha methacrylate monomer and related compounds, particularly in larger masses and solid shapes. A further object is to provide a process in which the practical difficulties in controlling the temperature of the mass during polymerization are overcome. A further object of the invention is to provide a practical and economical process of polymerizing these compounds in large masses to give a bubble free final product. Other objects of the invention will be apparent from the description given hereinafter.

The above objects are accomplished according to the present invention by heating a continuous mass comprising a liquid polymerizable compound from the class consisting of acrylic and alkacrylic acids, their homologues, and derivatives, until the temperature of at least some portion of the mass approaches the temperature of bubble formation, cooling said mass down until the polymerization reaction caused by the heating is substantially stopped throughout the mass, preferably the mass is cooled down until no portion of the same has a temperature substantially in excess of room temperature, again heating said mass until the temperature of at least some portion of the mass approaches the temperature of bubble formation, and then again cooling the mass as before. In some instances, at the end of this second heating treatment, the mass will be substantially completely polymerized. However, if it is not, the last two steps are repeated until the mass is substantially completely polymerized.

Among the compounds suitable for use in this invention may be mentioned acrylic acid and alkacrylic acid such as methacrylic and ethacrylic acids, their esters, derivatives, and homologues such as the nitriles, amides, substituted alkyl and aryl amides of these acids, as well as, more particularly, the esters of the alkacrylic acids as the alkyl esters of methacrylic and ethacrylic acids. Specifically may be mentioned monomeric methyl alpha methacrylate, ethyl alpha methacrylate, methyl alpha ethacrylate, and ethyl alpha ethacrylate. This class of compounds has the common characteristic of being liquids in monomeric form at room temperature and atmospheric pressure and polymerizing to solid thermoplastic resins. The present invention is also applicable to mixtures and interpolymers of these compounds.

In polymerizing one of these liquid monomeric compounds it is first subjected, in any suitable container, to a period of heating in order to initiate polymerization. The polymerization reaction is an exothermic one and, if it be allowed to proceed without control, particularly in a relatively large mass, bubbles will be formed by voltatilization of some component of the mixture or the releasing of dissolved air, or other gases. While the mass is in a relatively liquid state, such bubbles will promptly rise and leave the mass but as the material gradually thickens during polymerization, passing into the condition of a viscous liquid or a solid, the escape of bubbles ultimately becomes impossible, with the result that the polymerized mass in final form contains bubbles. It is necessary, therefore, that, once the liquid has reached a viscous condition, the reaction must be controlled in such a way that no bubbles can be formed. The formation of bubbles in the very early stages of the polymerization is not such a serious matter.

According to the present invention, heat is applied to the monomeric compond until some portion of the mass approaches the temperature of bubble formation. When this point has been reached the mass is then cooled down until the polymerization reaction is substantially stopped, preferably the mass is cooled down until it does not exceed room temperature in any portion thereof. Thereupon the mass is again heated until the temperature of bubble formation is approached, the cooling step again being applied, and the alternate heating and cooling continued until a substantially completely polymerized mass is obtained.

In order to operate the invention successfully it is, of course, necessary that in none of the heating steps, except at the beginning where the mass is in a very liquid form, that the temperature in any portion of the mass be allowed to reach the temperature of bubble formation. On the other hand, in order to operate the process as expeditiously as possible, the heating should be carried out just as long and to as high a point as may be safely done without formation of bubbles. The temperature to which the mass may be safely heated without danger of bubble formation is determined by the specific composition to be treated, the size of the mass, and the shape of the container. Therefore, in commercial operations a sample batch of the exact composition to be polymerized, in the exact amount, and in the same shaped container, is heated continuously until formation of bubbles is effected. This temperature is noted and, in carrying out the polymerization of subsequent batches, the heating of the mass is regulated so that the temperature in no portion of the mass quite approaches the temperature of bubble formation, as determined in the sample batch. In so operating, polymerization may be carried out as fast as possible with a determined degree of safety. Likewise, the duration and extent of the cooling period can also be determined upon a sample batch of the same composition, in the same amount, and in the same shaped container. The ideal operation of the process would mean that the mass is heated to as high a temperature and for as long a period as possible without the formation of bubbles and would be cooled down as little as possible while still substantially completely stopping the polymerization.

The purpose of the cooling step is to enable control of the operating conditions at relatively high temperature. These compounds have poor heat conductivity and, therefore, since the polymerization reaction is exothermic, the building up of excessive temperatures in local portions of large masses of the mass is unavoidable. Usually the highest temperature is approximately in the center of the mass. By holding the mass at a definite temperature slightly below the temperature of bubble formation, it would appear that polymerization of the mass could be effected in the shortest time. This is true in polymerizing smaller masses but in a large mass it is not true because, in order to prevent any local portion of the mass rising to the temperature of bubble formation, it is necessary to maintain the average temperature of the mass so low that polymerization is rather slow, even though means such as a water bath are employed to withdraw the exothermic heat of reaction at substantially the rate it is formed; the poor heat conductivity of the mass makes it impossible, in handling large masses of material, to effectively control the withdrawal of the heat.

According to the present invention, it has been found that the mass may be heated up to a higher temperature for a short period without danger of any portion of the mass reaching the temperature of bubble formation. Then, by cooling the mass down so that polymerization is substantially stopped and locally overheated portions are cooled off, the temperature can then again safely be raised to a relatively high point for another heating period without danger of formation of bubbles. By operating in this manner with alternate heating and cooling, it is possible to polymerize large masses of these compounds in solid shapes without danger of bubble formation in a shorter total period than if the mass were heated throughout to a temperature low enough to safely avoid bubble formation.

In order to illustrate the present invention, the following examples are given:

*Example 1.*—Liquid methyl alpha methacrylate monomer is poured into a lead mold of inside diameter 0.75″ and of length 20″, which mold is placed in a vertical position in an oven maintained at from 80–84° C. and is held therein for 3 hours. At the end of this period the temperature in local portions of the mass will have been found to have risen to a point close to the temperature of bubble formation. The mold is then removed from the oven and allowed to cool to approximately room temperature. Three hours after its removal from the oven it will be found that the mass throughout is cooled in all portions thereof and it is then again returned to the oven for a second period of three hours at the same oven temperature. This procedure, upon being repeated for a total of five complete heating and cooling stages, will give a substantially completely polymerized resin which, upon removal from the mold, will be an exceptionally clear rod free of bubbles and other internal flaws.

*Example 2.*—A mold having a cavity in the form of a tube of outside diameter 3.5″ and inside diameter 3.0″ and height 6″, was filled with liquid methyl alpha methacrylate monomer and placed for 3½ hours in an oven at a temperature of 70° C. It is then removed and cooled to room temperature for 3 hours. It is then alternately heated for 2½ hours and cooled for 3 hours at the same respective temperature, for 7 additional cycles. The tube of methyl alpha methacrylate polymer removed from the mold is crystal clear and free from bubbles and other internal flaws.

*Example 3.*—Ethyl alpha methacrylate monomer is poured into a lead mold identical with that used in Example 1 and the same periods of heating at the same temperatures and the same periods of cooling at room temperature are carried out for a total of 5 complete heating and cooling stages. The resin is then removed from the mold as a clear rod free of bubbles or other internal flaws.

It will be understood that the above examples are merely illustrative and that the specific temperatures and times for heating and cooling will be varied according to the particular composition employed, the amount of said composition, and the shape of the mold. Whereas the invention is broadly applicable to the compounds of the class herein described and the operation of the invention will be readily understood by those skilled in the art, it is necessary, in order to establish the optimum periods of heating and cooling and the respective temperatures used, to make a trial with a specimen batch under identical conditions with those to be used in the commercial operation of the process. Ordinarily in handling large solid shapes of methyl alpha methacrylate resin, the heating would be carried out in a water bath or oven or equivalent heating means held at a temperature of 70–85° C. and the heating period would be in the neighborhood of 3 hours. However, even for this specific compound the temperature of heating and the duration of the heating may be widely varied under different circumstances, which can only be determined for anything approaching the optimum conditions by trial on a specimen bath under identical conditions. Likewise, where others of this class of compounds are employed, a trial run on a specimen batch would also be necessary to determine optimum conditions.

The alternate heating and cooling treatments may be conducted in any convenient apparatus and, on a commercial scale, it is usually convenient to work out the heating and cooling periods in such a way as to effect economical use of the equipment, for example so as to permit material being polymerized to be interchanged between the heating and cooling equipment so that both may be kept in substantially constant use. The cooling may be effected by artificial means if desired, it being obvious that the period of cooling can be shortened if the mass is exposed to an extremely low temperature. It is to be understood that, in connection with the cooling, it is necessary that the mass be cooled down sufficiently so that upon commencing the re-heating no portion of the mass will be appreciably warmer than any other portion, otherwise the heating cycle will have to be terminated in a short while because some local portion of the material has approached the temperature of bubble formation, whereas the greater part of the mass is at a relatively low temperature. It will be apparent that the higher the temperature applied in the heating stage, the shorter must be the duration of that stage because of the fact that at least some porion of the mass will more quickly reach a temperature approaching that of bubble formation.

The process may be carried out with vessels or molds of any shape or material. In accordance with common practice a cast lead mold having a slight taper is satisfactory, but glass vessels may be used, as well as vessels or molds of other materials which do not have specific unfavorable influences upon the progress of the polymerization reaction. Ordinarily a tapered mold will be employed to admit the release of the finished mass but split molds may likewise be employed. If desired, the polymerization may be carried out under positive pressure.

For the sake of simplicity the invention has been described with relation to the polymerization of a single compound coming within the class of compounds to which this invention relates. However, the operation of the invention is the same whether one or a mixture of these compounds are employed. Likewise, various auxiliary agents may be added to the monomer prior to the polymerization process. Such agents would include accelerating agents, plasticizers, coloring matter, effect materials, and the like. In the Hill application previously referred to a large number of the suitable plasticizers, accelerators, and other materials which may be added, are disclosed. Where a plasticizer is employed in relatively high amounts, for example, 40% by weight of the compound being polymerized, the heat conductivity of the mass is materially improved and the difficulty in constantly maintaining a temperature approaching the temperature of bubble formation is therefore decreased and, in smaller masses, fair speed of polymerization may be obtained without the cooling step of the present invention. However, where a larger solid mass is to be polymerized, the difficulty in controlling the temperature throughout the mass is encountered and the alternate heating and cooling method of the present invention may be applied to the same advantage as where a smaller proportion of plasticizer, or no plasticizer, is being used.

The present invention provides a method of preparing glass clear resin products free of visual flaws, in large masses, without encountering conditions substantially impossible of control in commercial operation. Objects of any section, contour, and thickness, whether solid or hollow, may be made, as for example, in the manufacture of slabs, blocks, rods, tubes, rings, electric insulating parts, or any other articles such as are commonly produced from phenolic resins, cellulose derivatives, and like materials. Resinous bodies may be prepared to be fabricated into articles by machining, or otherwise cutting, from rods, blocks, and the like, for the preparation of a wide assortment of objects such as beads, bracelets, and the like. The compositions may be made transparent, opaque, plain or colored, and with any desired pattern or mottle, as for instance imitation pearl, tortoise shell, and the like.

As many apparently widely different embodiments of this invention may be made without departing from the spirit and scope thereof, it is to be understood that the invention is not limited to the specific embodiments thereof except as defined in the appended claims.

I claim:

1. Process of preparing a bubble free product comprising heating a continuous mass comprising a liquid polymerizable compound from the class consisting of acrylic and alkacrylic acids, their homologues, and derivatives, until the temperature of at least some portion of the mass approaches the temperature of bubble formation, cooling said mass down until the polymerization reaction caused by the heating is substantially stopped throughout the mass, again heating said mass until the temperature of at least some portion of the mass approaches the temperature of bubble formation, and again cooling the mass as before.

2. Process of preparing a bubble free product comprising heating a continuous mass comprising a liquid polymerizable compound from the class consisting of acrylic and alkacrylic acids, their homologues, and derivatives, until the temperature of at least some portion of the mass approaches the temperature of bubble formation, cooling said mass down until no portion of the mass has a temperature substantially in excess of room temperature, again heating said mass until the temperature of at least some portion of the mass approaches the temperature of bubble formation, and again cooling the mass as before.

3. Process of preparing a bubble free product comprising heating a continuous mass comprising a liquid polymerizable compound from the class consisting of acrylic and alkacrylic acids, their homologues, and derivatives, until the temperature of at least some portion of the mass approaches the temperature of bubble formation, cooling said mass down until the polymerization reaction caused by the heating is substantially stopped throughout the mass, again heating said mass until the temperature of at least some portion of the mass approaches the temperature of bubble formation, again cooling the mass as before, and repeating said last two steps until the mass is substantially completely polymerized.

4. Process of preparing a bubble free product comprising heating a continuous mass comprising a liquid polymerizable compound from the class consisting of acrylic and alkacrylic acids, their homologues, and derivatives, until the temperature of at least some portion of the mass approaches the temperature of bubble formation, cooling said mass down until no portion of the mass has a temperature substantially in excess of room temperature, again heating said mass until the temperature of at least some portion of the mass approaches the temperature of bubble formation, again cooling the mass as before, and repeating said last two steps until the mass is substantially completely polymerized.

5. Process of preparing a bubble free product comprising heating a continuous mass comprising liquid methyl alpha methacrylate monomer until the temperature of at least some portion of the mass approaches the temperature of bubble formation, cooling said mass down until the polymerization reaction caused by the heating is substantially stopped throughout the mass, again heating said mass until the temperature of at least some portion of the mass approaches the temperature of bubble formation, and again cooling the mass as before.

6. Process of preparing a bubble free product comprising heating a continuous mass comprising liquid methyl alpha methacrylate monomer until the temperature of at least some portion of the mass approaches the temperature of bubble formation, cooling said mass down until no portion of the mass has a temperature substantially in excess of room temperature, again heating said mass until the temperature of at least some portion of the mass approaches the temperature of bubble formation, and again cooling the mass as before.

7. Process of preparing a bubble free product comprising heating a continuous mass comprising liquid methyl alpha methacrylate monomer until the temperature of at least some portion of the mass approaches the temperature of bubble formation, cooling said mass down until the polymerization reaction caused by the heating is substantially stopped throughout the mass, again heating said mass until the temperature of at least some portion of the mass approaches the temperature of bubble formation, again cooling the mass as before, and repeating said last two steps until the mass is substantially completely polymerized.

8. Process of preparing a bubble free product comprising heating a continuous mass comprising liquid methyl alpha methacrylate monomer until the temperature of at least some portion of the mass approaches the temperature of bubble formation, cooling said mass down until no portion of the mass has a temperature substantially in excess of room temperature, again heating said mass until the temperature of at least some portion of the mass approaches the temperature of bubble formation, again cooling the mass as before, and repeating said last two steps until the mass is substantially completely polymerized.

GLEN M. KUETTEL.